Aug. 15, 1950

K. RATH 2,518,718

TWIN-LENS REFLEX CAMERA

Filed Oct. 13, 1948

INVENTOR.

Karl Rath

Patented Aug. 15, 1950

2,518,718

UNITED STATES PATENT OFFICE 2,518,718

TWIN-LENS REFLEX CAMERA

Karl Rath, New York, N. Y.

Application October 13, 1948, Serial No. 54,250

3 Claims. (Cl. 95—44)

The present invention relates to photographic cameras, more particularly to an improved twin-lens reflex camera of the type comprising a finder lens synchronized with the picture-taking lens and a ground glass focusing screen showing a full size and right-side-up picture.

Twin-lens reflex cameras using roll film as negative material have become very popular in the past for various reasons due mainly to the full size of the viewing image upon the ground glass screen, enabling both easy sharp focusing and composition or judgment of the pictorial effect of the picture shown upon the screen. Moreover, the viewing image, on account of using separate finder and picture-taking lenses, is clearly visible at maximum brightness up to and during the exposure of the film, whereby to greatly facilitate the focusing and composition of a scene or subject.

On the other hand, a disadvantage of known types of reflex cameras is due to their relative great bulk and box-like shape with the resultant inconvenience in carrying the camera, especially during extended trips or excursions. Attempts to design a collapsible twin-lens reflex camera on the basis of known camera constructions, have so far failed due to the mechanical complexity and difficulties in providing two collapsible camera chambers together with a reflecting mirror and focusing hood in accordance with the standard design of cameras of this type.

Accordingly, an object of the present invention is to provide an improved collapsible twin-lens reflex camera which substantially overcomes the above-mentioned difficulties; which while relatively simple and compact in design, is easy to operate from its collapsed into its picture-taking position and vice versa; and which provides a focusing image of improved brightness and less subject to interference by surrounding light or reflections, compared with known types of reflex cameras in the art.

The above and further objects and novel aspects of the invention will become more apparent from the following detailed description taken in reference to the accompanying drawing forming part of this specification and wherein.

Like reference numerals identify like parts in the different view of the drawing.

Figure 1:
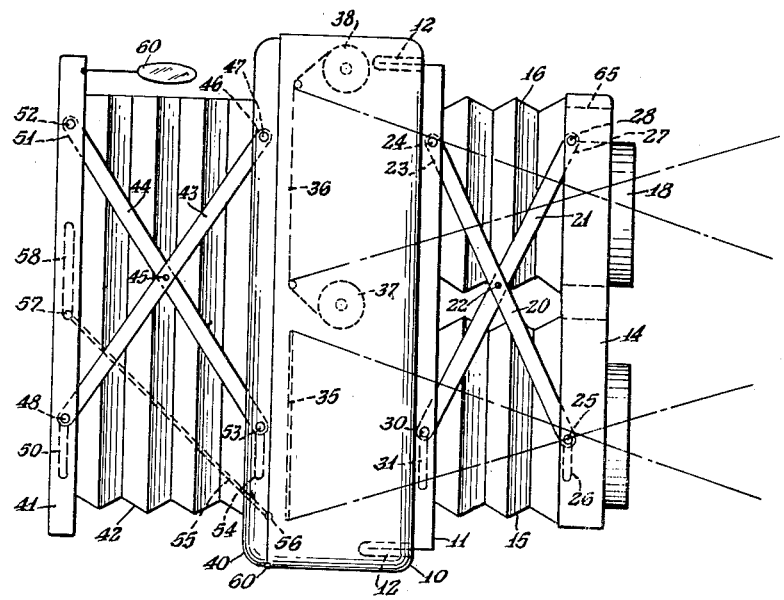
Figure 1 shows, in diagrammatic form, a side view of a twin-lens reflex camera in the operative or extended position and constructed in accordance with the principles of the invention.

Referring to Figure 1, the numeral 10 represents a relatively flat camera body or casing having secured to its front in relatively slidable engagement therewith a panel or casing 11 maintained in exact parallelism with the body 10 by means of guides indicated at 12, in a manner well understood and shown for instance in greater detail in my co-pending application Serial No. 29,313 filed May 26, 1948, entitled Camera With Photoelectric Exposure Control.

Extensibly and collapsibly attached to the panel 11 is a further front or lens panel 14 carrying a finder lens 17 and a picture-taking lens 18, the latter being positioned above the former. Panel 14 is connected with the panel or casing 11 through a pair of light-tight collapsible bellows 15 and 16, one for each of the lenses 17 and 18, and a suitable linkage arrangement for maintaining the panel 14 in parallelism with the panel 11 and in turn with the body 10, said linkage arrangement taking, in the example shown, the form of a lazy tongs mechanism. The latter comprises a pair of links 20 and 21 pivoted together at 22, one pair of links being arranged on either side of the panels 11 and 14. The end 23 of the link 20 of each pair is connected to a pivot 24 within the panel 11, while the opposite end of this link is provided with a pivot 25 arranged to slide within a guide slot 26 formed in the side of the panel 14. Similarly, the end 27 of link 21 is connected by a fixed pivot 28 to the panel 14, while the opposite end of this link is provided with a pivot or pin 30 arranged to slide within a guide slot 31 formed in the side of the panel 11. The lens panel 14 can thus move into and out of the panel 11 and in turn of the body 10 with its central plane being maintained in exact parallelism with said body and in turn with the focal planes of the lenses 18 and 19. As is understood, any other known type of parallel guide arrangement or mechanism connecting the slidable casing 11 with the lens panel 14 or body 10 may be employed for the purpose of the invention.

Both lenses 17 and 18 mounted upon the panel are exactly matched so as to be of the same focal length and to produce equal and sharp images upon both the ground glass 35 and film 36 arranged in the common focal plane within the body or casing 10. The film 36 is unwound from a supply spool 37 and wound onto a take-up spool 38 by means of any suitable manual or automatic film winding mechanism known in the art.

Attached to the hinged back or cover 40 of the camera body 10 is a further extensible panel 41 connected to said cover through a further collapsible bellows 42 and linkage arrangement in the form of a lazy tongs mechanism shown in the example illustrated. The latter comprises a pair of links 43 and 44 pivoted together at 45, one pair of links being provided on each side of the cover 40 and panel 41. The end 46 of the link 43 is connected to a pivot 47 within the cover 40, while the opposite end of this link is provided with a pivot 48 arranged to slide along a guide slot 50 formed in the side of the panel 41. Similarly, the end 51 of link 44 is connected by a fixed pivot 52 to the panel 41, while the opposite end of this link is provided with a pivot or pin 53 arranged to slide along a guide slot 54 formed within the side of the cover 40. The panel 41 can thus move towards and away from the body 10 with its plane being maintained in parallelism with said body and the focal plane in the camera, in a manner substantially similar to the operation of the lens panel 14.

Figure 2:
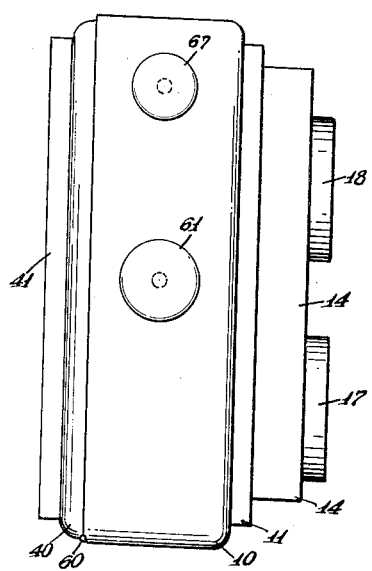
Figure 2 shows a camera according to Figure 1 in the collapsed or non-operative position.

Contrary to the bellows 14 and 15 for the lenses 17 and 18 which serve to provide a pair of dark chambers for the ground glass 35 and film 36, respectively, the rear panel 41 and single bellows 42 covering the entire back of the camera body has its top removed to serve as a viewing and focusing hood for the ground glass 35 by the further provision of a reflecting mirror 55 having its lower edge pivoted to the cover 40 at 56 and having its opposite edge provided with a pivot 57 arranged to move along a further guide slot 58 formed within the side of the panel 41. In this manner, the mirror 55 may be swung outwardly about its pivot 56 to form a 45° angle with the ground glass screen 35 as shown in Figure 1 and may be collapsed together with the bellows 42 and the lazy tongs mechanism in non-use position of the focusing hood, as shown in Figure 2.

In use, with both the lens panel 14 and focusing hood panel 41 extended in the manner shown in Figure 1 of the drawing, a full size and right-side-up picture produced by the finder lens 17 upon the ground glass screen 35 will appear in the focusing hood. A magnifier 60 pivoted to the upper edge of the panel 41 may be provided for critical sharp focusing, as is customary with reflex cameras. The synchronized focusing of both lenses may be effected in any known manner such as by moving in and out the focusing panel 11 by the aid of a focusing knob 61 mounted upon the side of the camera and operating a rack or equivalent mechanism associated with the panel 11, in the manner shown in greater detail in the above-mentioned co-pending application.

Figure 3:
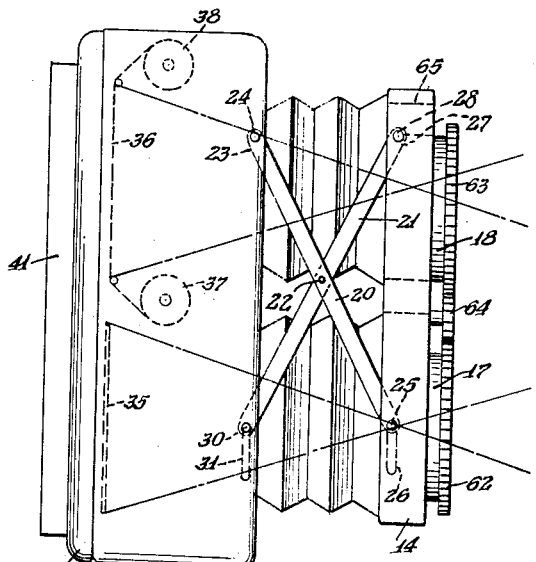
Figure 3 illustrates a modification of Figure 1.

Alternatively, the lens panel 14 may be directly connected to the camera body 11 through the bellows 15 and 16 and lazy tongs mechanism in the manner shown in Figure 3. In this case, the synchronized focusing of the lenses 17 and 18 may be effected by means of a pair of focusing gears 62 and 63 operating the focusing adjustments and being connected through an intermediate gear 64, or by any other known focusing gear arrangement known and used in the operation of twin-lens cameras.

The picture-taking lens 18 is provided with a suitable shutter such as a between-the-lens shutter as indicated at 65, while the film winding mechanism may be of any known construction, these and other details having been omitted for the sake of simplicity of the drawing and disclosure and as being unnecessary for the understanding of the invention. The back or cover 40 shown to be pivoted at 60 is provided for loading and unloading the camera, in a manner well understood. According to a modification, the cover 40 may be omitted and the focusing hood comprising bellows 42, panel 41 and the lazy tongs mechanism directly secured to the back of the camera body 10. In this case suitable means may be provided for loading and unloading the film from the side of the camera, as will be readily understood.

There is thus provided by the invention a collapsible twin-lens reflex camera which, while small and compact in the collapsed position, may be simply and instantly extended into the operative or picture-taking position, substantially without sacrifice of any of the known advantages of the standard type of twin-lens camera. Among the further advantages of the invention over known types of twin-lens reflex cameras is to be mentioned the fact that the reflecting mirror 55 is arranged outside the optical path of the finder lens 17. This results in a substantial simplification of the design and adjustment and insures synchronized focusing adjustment under all circumstances. Furthermore, the arrangement of the finder lens 17 below the picture-taking lens 18, results in an increased depth of the focusing hood which in turn produces a brighter viewing image unhampered by interfering surrounding lights or reflections, a drawback generally experienced with known types of reflex cameras of standard design.

While there has been shown and described a desirable embodiment of the invention, it is understood that this disclosure is for the purpose of illustration and that various changes in shape, proportion and arrangement of parts as well as the substitution of equivalent elements for those herein shown and described may be made without departing from the spirit and scope of the invention as defined in the appended claims. The specification and drawing are accordingly to be regarded in an illustrative rather than in a limiting sense.

I claim:

1. In combination with a twin-lens camera of the type having a casing, a panel carrying matched finder and picture taking lenses, collapsible bellows and parallel guide means connecting said panel to the front of said casing and a ground glass and picture frame mounted in the common focal plane of said lenses; a reflex finder comprising a further panel and collapsible bellows and parallel guide means connecting said further panel to the back of said casing, a mirror having one edge pivoted to said casing adjacent to the side of said screen remote from said picture frame, and means for slidably supporting the opposite edge of said mirror by said panel, said mirror assuming a 45° angle with said screen in the extended position and folding against said screen in the collapsed position of said further panel, said further bellows having an opening opposite to said mirror to reveal the image upon said screen reflected by said mirror in the extended position thereof.

2. In combination with a twin-lens camera of the type having a casing, a panel carrying matched finder and picture taking lenses, collapsible bellows and parallel guide means connecting said panel to the front of said casing, a ground glass and picture frame mounted in the common focal plane of said lenses and a hinged back plate for said casing; a reflex finder comprising a further panel and further collapsible bellows and parallel guide means connecting said further panel to said back plate, a mirror having one edge pivoted to said back plate adjacent to the side of said screen remote from said picture frame, and means for slidably supporting the opposite edge of said mirror by said panel, said mirror assuming a 45° angle relative to said screen in the extended position of said further panel and folding against said screen in the collapsed position of said further panel, said further bellows having an opening opposite to said mirror to reveal the image upon said screen reflected by said mirror in the extended position of said further panel.

3. In combination with a twin-lens camera of the type having a casing, a panel carrying matched finder and picture taking lenses, collapsible bellows and parallel guide means connecting said panel to the front of said casing and a ground glass and picture frame mounted in the common focal plane of said lenses; a reflex finder comprising a further panel and further collapsible bellows and parallel guide means connecting said further panel to the back of said casing, said further bellows extending over substantially the entire back of said casing, a mirror having one edge pivoted to said casing adjacent to the side of said screen remote from said picture frame, and guide means for slidably supporting the opposite edge of said mirror by said further panel, said mirror assuming a 45° angle with said screen in the fully extended position of said further panel and folding against said screen in the collapsed position of said further panel, said further bellows having an opening opposite to said mirror to reveal the image upon said screen reflected by said mirror in the extended position of said further panel.

KARL RATH.

REFERENCES CITED

The following references are of record in the file of this patent:

UNITED STATES PATENTS

| Number | Name | Date |
|---|---|---|
| 442,616 | Ellison | Dec. 16, 1890 |
| 622,574 | Wallace | Apr. 4, 1899 |
| 781,061 | Hartmann | Jan. 31, 1905 |
| 834,089 | Wallace | Oct. 23, 1906 |
| 1,121,178 | Freud | Dec. 15, 1914 |
| 1,528,464 | Beidler et al. | Mar. 3, 1925 |
| 1,833,668 | Beidler et al. | Nov. 24, 1931 |
| 2,173,553 | Graf | Sept. 19, 1939 |

FOREIGN PATENTS

| Number | Country | Date |
|---|---|---|
| 40 | Great Britain | 1912 |
| 384,629 | Great Britain | Dec. 8, 1932 |
| 596,224 | Germany | Apr. 28, 1934 |
| 669,438 | Germany | Dec. 27, 1938 |